United States Patent Office 3,338,669
Patented Aug. 29, 1967

3,338,669
PRODUCTION OF SODIUM AZIDE
Gerhard Dusing, Wolfgang, near Hanau, Gunther Bretschneider, Gelnhausen, Harry Kloepfer, Frankfurt am Main, Fritz Sperr, Langen, near Frankfurt am Main, and Heinrich Schmidt, Frankfurt am Main, Germany, assignors to Deutsche Gold- und Silber-Scheideanstalt vormals Roessler, Frankfurt am Main, Germany
No Drawing. Filed June 25, 1965, Ser. No. 467,128
Claims priority, application Germany, June 27, 1964, D 44,785
3 Claims. (Cl. 23—101)

ABSTRACT OF THE DISCLOSURE

Process for the production of sodium azide comprising reacting nitrous oxide with a mixture of $Na_2O$ with at least one member selected from the group consisting of $NH_3$ and $NaNH_2$, the molar ratio of $Na_2O$ to $NH_3$ to $NaNH_2$ being $2-Y:1-Y:Y$ where $Y$ is a number from 0 to 1 inclusive.

The present invention relates to an improved process for the production of sodium azide by reaction of a sodium compound with nitrous oxide ($N_2O$).

It is known that alkali metal azides, especially, sodium azide, can be produced by reaction of the corresponding alkali metal amide with nitrous oxide. In such process the nitrous oxide can be reacted with molten alkali metal amide or the reaction can be carried out in liquid ammonia. In a similar manner nitrous oxide can also be introduced into solutions of sodium in water free ammonia. In general these reactions can be represented by the equation:

$$NaNH_2 + N_2O \rightarrow NaN_3 + H_2O$$

The water which is produced in such reaction consumes a further mol of the amide with the formation of ammonia according to the following equation:

$$NaNH_2 + H_2O \rightarrow NaOH + NH_3$$

The overall equation for the reaction therefore is as follows:

$$2NaNH_2 + N_2O \rightarrow NaN_3 + NaOH + NH_3$$

Usually the reaction of the amide with the nitrous oxide is combined with the production of the amide from sodium and ammonia in a two step process. However, it previously has not been possible to react ammonia and nitrous oxide simultaneously with sodium in a controlled manner without first having to provide a solution of sodium in ammonia, as in the direct simultaneous reaction an uncontrollable reaction with occurrence of explosions results and the desired azide is not formed.

According to the invention it was found that sodium azide can be formed in a single step reaction by reacting ammonia and nitrous oxide with sodium monoxide in the absence of a solvent.

According to the invention, therefore, the source of sodium is the sodium monoxide rather than the sodium amide alone or dissolved sodium metal which were previously used as the starting materials.

In the process according to the invention the ammonia and sodium monoxide react to form sodium hydroxide and sodium amide and the latter reacts with the nitrous oxide which has been simultaneously supplied. Such process is represented by the following equations:

$$2Na_2O + 2NH_3 \rightarrow 2NaNH_2 + 2NaOH$$
$$2NaNH_2 + N_2O \rightarrow NaN_3 + NaOH + NH_3$$

$$2Na_2O + NH_3 + N_2O \rightarrow NaN_3 + 3NaOH$$

Contrary to the previously known processes, the process according to the invention does not lead to the formation of a gaseous product. It, therefore, is possible to operate the process continuously in a closed system, if desired, under superatmospheric pressure, if a suitable arrangement is provided for withdrawal of the solid reaction products.

According to an especially advantageous embodiment of the process according to the invention, the ammonia can be partially or completely replaced by sodium amide. In such instance, for every mol of ammonia which is replaced by the sodium amide the quantity of sodium monoxide must also be reduced by a mol. The reaction of the sodium amide with the nitrous oxide forms the ammonia necessary for reaction with the remainder of the sodium monoxide. When all of the ammonia to be supplied for the reaction is replaced by sodium amide so that the reaction occurs between equimolar proportions of sodium monoxide, sodium amide and nitrous oxide, the reaction is represented by the following equation:

$$Na_2O + NaNH_2 + N_2O \rightarrow NaN_3 + 2NaOH$$

The process according to the invention in general involves the reaction of nitrous oxide with a mixture of sodium monoxide and at least one reactant of the group of ammonia and sodium amide, the proportions of the $Na_2O:NH_3:NaNH_2$ reacted with the $N_2O$ being $$2-Y:1-Y:Y$$

where $Y$ is a number between 0 and 1 inclusive.

As is apparent, it is advantageous if the $Na_2O$ and $NaNH_2$ are supplied in equimolar (1:1) proportion which corresponds to a ratio of 1:0.64 by weight. In such instance it is not necessary to supply ammonia nor is it necessary as in previous processes to withdraw ammonia from the reaction product. Of course, it would be possible to work with an excess of sodium amide so as to combine the present process with that of the prior art wherein $NaNH_2$ and $N_2O$ are reacted in the absence of $Na_2O$ but this would only result in the formation of the undesired ammonia from such excess.

The process according to the invention can be carried out at temperatures between 110° C. and the decomposition temperature of the sodium azide produced and preferably is carried out at a temperature between about 170° C. and 190° C.

The process according to the invention results in mixtures of sodium azide and sodium hydroxide in a molar ratio of 1:2 to 1:3. Such mixtures can be separated in a manner known per se by treatment with water.

The following examples will serve to illustrate the invention with reference to several embodiments thereof.

Example 1

A gas mixture of 50 vol. percent of each of $NH_3$ and $N_2O$ was introduced into a rotary glass tube which was closed at one end and which contained 20.0 g. of $Na_2O$ diluted with 80.5 g. of the product of an analogous test (containing 28.1 g. of $NaN_3$ and 52.4 g. of NaOH). The introduction of such gas mixture was at the rate of its consumption. The temperature during such introduction was raised from 110° C. to 190° C. The consumption of the gas mixture was completed after 150 minutes (total consumption=7.7 liters). The reaction mixture contained 38.1 g. of $NaN_3$ indicating that 10.0 g. of new $NaN_3$ had been formed which corresponded to a yield 95% of theory.

Example 2

$N_2O$ gas was introduced into a rotating glass tube containing 8.7 g. of $NaNH_2$, 13.6 g. of $Na_2O$ diluted with 77.4 g. of a reaction product of an analogous test (containing 36.9 g. of $NaN_3$, 0.5 g. of $NaNH_2$ and 40 g. of NaOH). The introduction of the $N_2O$ was at the rate of its consumption. The temperature was raised from 140° C. to 200° C. during such introduction. The consumption of the $N_2O$ was completed after 100 minutes (total consumption=5.3 liters). The reaction mixture contained 51.3 g. of $NaN_3$, 0.7 g. of $NaNH_2$ and 59.0 g. of NaOH indicating formation of 14.4 g. of $NaN_3$ and 19.0 g. of NaOH corresponding to a yield of 99% of theory.

Example 3

400 g. per hour of a stoichiometric mixture of $NaNH_2$ and $Na_2O$ (molar ratio 1:1) was continuously introduced into a stirring vessel which was closed to the atmosphere which had been provided initially with 1.5 g. of the reacted product ($NaN_3$+2NaOH) as diluent. Simultaneously a sufficient amount of $N_2O$ was introduced into such vessel so that the pressure therein remained constant in the neighborhood of atmospheric pressure. The reaction vessel was maintained at a temperature of 175–180° C. The consumption of $N_2O$ was 85 N l./h. Every 30 minutes a portion of the very flowable solid reaction product was withdrawn from the vessel through a bottom valve. The reaction product contained practically no $NaNH_2$. 260 g. of $NaN_3$ were produced per hour.

We claim:
1. A process for the production of sodium azide which comprises reacting nitrous oxide at a temperature between about 110° C. and the decomposition temperature of the sodium azide produced with a mixture of $Na_2O$ with at least one member selected from the group consisting of $NH_3$ and $NaNH_2$, the molar ratio of $Na_2O$ to $NH_3$ to $NaNH_2$ being $2-Y:1-Y:Y$ where $Y$ is a number from 0 to 1 inclusive.
2. The process of claim 1 in which said mixture consists substantially of $Na_2O$ and $NaNH_2$ in a molar ratio of 1:1.
3. The process of claim 1 in which the solid reactants are diluted with a substantial quantity of reaction product and such diluted solid reactants are kept in motion while reacted with the gaseous portion of the reactants.

References Cited

UNITED STATES PATENTS 2,994,583  8/1961  Levering _____ 23—101

OSCAR R. VERTIZ, *Primary Examiner.*

A. GREIF, *Assistant Examiner.*